Nov. 10, 1931.  C. M. AHLENE ET AL  1,830,746
DRIVEN PLATE
Filed Dec. 12, 1928
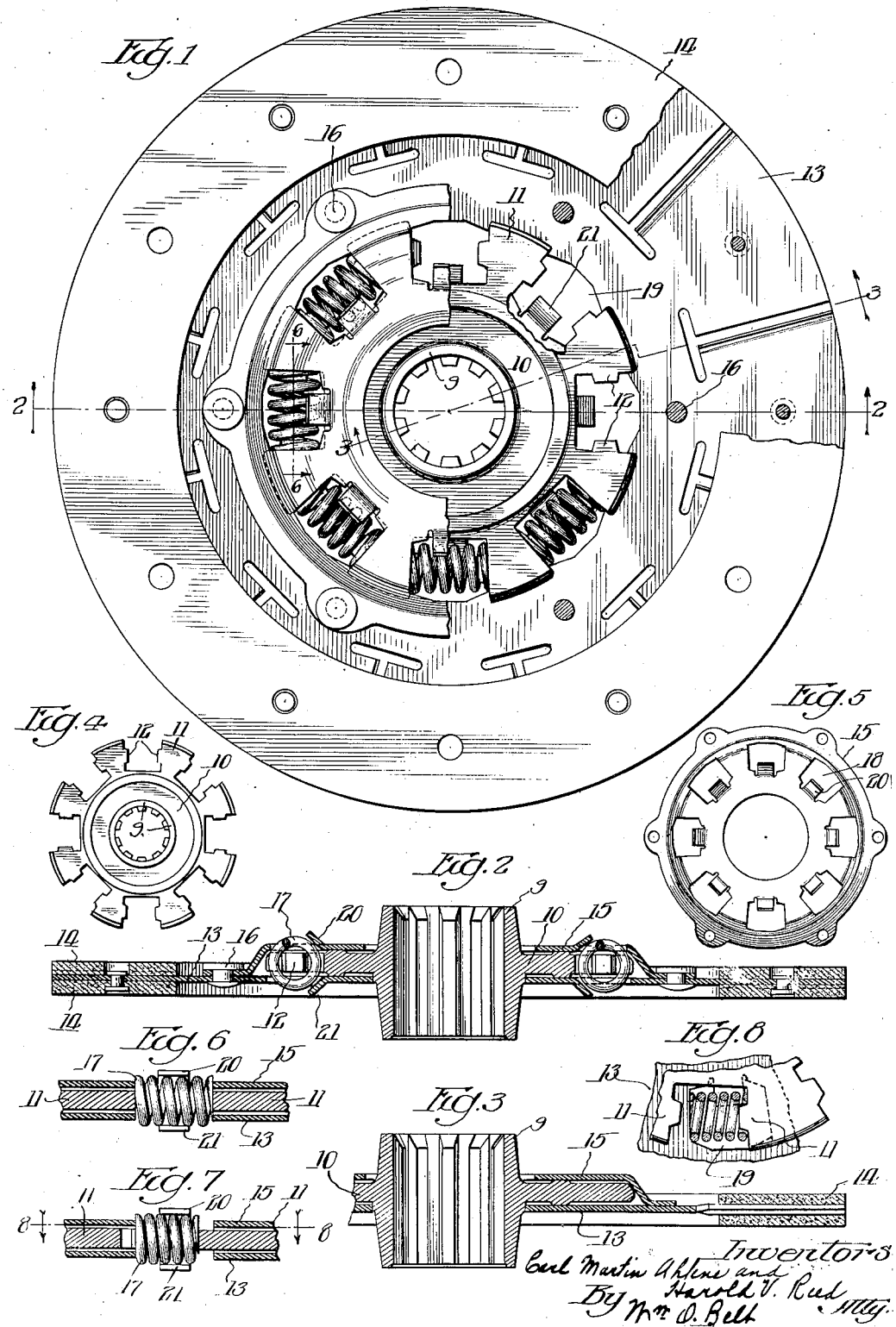

Patented Nov. 10, 1931

1,830,746

UNITED STATES PATENT OFFICE

CARL MARTIN AHLENE AND HAROLD V. REED, OF CHICAGO, ILLINOIS, ASSIGNORS TO THE BORG & BECK COMPANY, OF CHICAGO, ILLINOIS, A CORPORATION OF ILLINOIS

DRIVEN PLATE

Application filed December 12, 1928. Serial No. 325,568.

This invention relates to friction clutches of the kind wherein a driven plate is interposed between two parts of a driving member and is adapted to be gripped or clamped by the parts under sufficient pressure to impart motion from the driving member to the driven member; and it relates more particularly to the cushioned type of driven plate set forth in the application of Carl Martin Ahlene, Serial No. 261,304, filed March 13, 1928. Patent No. 1,727,153, patented September 3, 1929.

The object of this invention is to provide a cushioned driven plate of this type which shall be sufficiently yieldable to take hold smoothly, evenly and quickly and without setting up vibrations in the clutch or carrying forward engine vibrations to the transmission and which will be free from excessive wear and continue to perform its functions efficiently throughout the life of the clutch.

Another object of the invention is to mount the cushioned springs in the driven plate in a novel manner to insure their retention in place but with the least amount of restriction so as to preserve their freedom of movement without excessive wear.

In the accompanying drawings illustrating a selected embodiment of the invention Fig. 1 is a side elevation of the driven plate, partly broken away and partly in section.

Fig. 2 is a sectional view on the line 2—2 of Fig. 1.

Fig. 3 is a sectional view on the line 3—3 of Fig. 1.

Fig. 4 is an elevation on a reduced scale of the hub member.

Fig. 5 is a side elevation on a reduced scale of the side plate.

Fig. 6 is a detail sectional view on the line 6—6 of Fig. 1.

Fig. 7 is a view similar to Fig. 6 showing the spring under compression.

Fig. 8 is a detail sectional view on the line 8—8 of Fig. 7.

Referring to the drawings the driven plate comprises a friction member which is mounted upon a centrally disposed hub member, and coil springs are interposed between said members and mounted in a novel manner so that movement of the friction member is communicated through the spring cushion to the hub member without setting up vibrations in the clutch and without carrying forward engine vibrations to the transmission, the springs being securely retained against accidental displacement and at the same time being free from restriction which would be apt to produce excessive wear.

The hub member comprises a hub 9 having an integral peripheral flange 10 and a plurality of radially disposed spokes 11 projecting therefrom, these spokes having oppositely disposed lugs 12 thereon. The friction member comprises a plate 13 which is loosely mounted on the hub alongside the flange 10 and is provided with friction facings 14. The friction plate member may be made as shown in Patent No. 1,659,289, patented February 14, 1928, or in any other suitable form. A side plate 15, Fig. 5, is secured by rivets 16 or other suitable fastening devices to the plate member 13 and it is bent to overlap the flange 10 and form with the friction plate member a housing for the flange and for the coil springs 17 which are arranged between the friction plate and the side plate and between the spokes of the hub member. The side plate has openings 18 disposed opposite the springs and the friction plate has similar openings 19. Lips 20 are formed on the side plate at the inner edges of the openings 18 and lips 21 are formed on the friction plate at the inner edges of the openings 19 to prevent displacement of the springs from their seats between the spokes 11 of the hub member and between the ends of the openings 18 in the side plate and the openings 19 in the friction plate. These lips are bent outward to conform generally to the shape of the springs and sufficiently to maintain a consistent clearance between themselves and the springs. The lugs 12 on the spokes engage the ends of the springs and center the springs in their seats so that they will not engage the lips 20 and 21, or the outer edges of the openings 18 and 19. The springs will be always retained by the lugs 12 in their seats and will be restrained against displacement by the lips 20 and 21 in extreme conditions. These springs are loose members which must operate freely for best results and which must be effectively retained in operative position. It is recognized that the springs and the contacting parts will wear in service and that sometimes springs develop defects in service which pass most careful inspection. It is necessary that the springs should contact at their ends with other parts of the driven plate but it is highly important that they should not contact at their sides with any of these parts because the contraction and expansion of the springs in service, which occurs frequently, would produce wear and this would reduce the life of the friction member and create undesirable noises. A broken spring or a badly worn spring may drop out of its seat and produce serious trouble in the clutch. Therefore, it is highly important to effectively retain the springs in the driven member and in such manner that they will not be subjected to unnecessary or excessive wear. This we have accomplished in the manner shown and described herein and it will be observed that the springs are at all times clear from the parts about them except at their ends, and while they are securely retained in their seats they are free, except at their ends, from contact with any part of the friction member. In providing for clearance between the springs and the adjacent parts of the friction member we prefer to widen the openings 18 and 19 between their ends, as shown more clearly in Fig. 5, to accommodate any transverse enlargement of the springs under compression and any outward movement of the springs under centrifugal force.

We have shown the invention in the form which has been found to be commercially satisfactory but clutches and friction members are made in many sizes, shapes and styles and we reserve the right to make such changes as may be necessary for adapting our invention to any other friction members, or for other purposes within the scope of the following claims.

We claim:

1. A driven plate for friction clutches comprising a hub member having a flange, a friction member comprising a friction plate overlapping said flange and a side plate rigid with the friction plate and overlapping said flange, said flange, friction plate and side plate provided in their overlapped parts with unrestricted registering openings, and coil springs seated in said openings between the end walls thereof and forming a sectional spring cushion between the friction member and the hub member.

2. A driven plate for friction clutches comprising a hub member having a flange, a friction member comprising a friction plate overlapping said flange and a side plate rigid with the friction plate and overlapping said flange, said flange, friction plate and side plate provided in their overlapped parts with unrestricted registering openings, guard means on said plates at the edges of said openings and normally out of engagement with said springs, and coil springs seated in said openings between the end walls and out of engagement with the edges thereof and forming a sectional spring cushion between the friction member and the hub member.

3. A driven plate for friction clutches comprising a hub member having a flange, a friction member comprising a friction plate overlapping said flange and a side plate rigid with the friction plate and overlapping said flange, said flange, friction plate and side plate provided in their overlapped parts with unrestricted registering openings, guard lips projecting from the edges of said openings adjacent to but normally out of engagement with said springs, and coil springs seated in said openings between the end walls and out of engagement with the edges thereof and forming a sectional spring cushion between the friction member and the hub member.

4. A driven plate for friction clutches comprising a hub member having a flange, a friction member overlapping the flange, said flange and friction member provided in their overlapping parts with registering openings, coil springs seated in said openings between the end walls and out of engagement with the edges thereof, means for retaining the springs in said openings, and means for accommodating outward movement of the springs under compression and centrifugal force.

5. A driven plate for friction clutches comprising a hub member having a plurality of spokes, a friction member comprising a friction plate overlapping said spokes on one side thereof and a side plate rigid with the friction plate and overlapping the spokes on the other side thereof, said friction plate and side plate having unrestricted openings registering with the open spaces between the spokes on the hub member, and coil springs seated in said openings between the end walls and out of engagement with the edges thereof and forming a sectional spring cushion between the friction member and the hub member.

6. A driven plate for friction clutches comprising a hub member having a plurality of spokes, a friction member comprising a friction plate overlapping said spokes on one side thereof and a side plate rigid with the friction plate and overlapping the spokes on the other side thereof, said friction plate and side plate having unrestricted openings registering with the open spaces between the spokes on the hub member, coil springs seated in said openings between the end walls and out of engagement with the edges thereof and forming a sectional spring cushion between the friction member, and the hub member and retaining lugs on the spokes engaging the ends of the springs.

7. A driven plate for friction clutches comprising a hub member having a plurality of spokes, a frictional member comprising a friction plate overlapping said spokes on one side thereof and a side plate rigid with the friction plate and overlapping the spokes on the other side thereof, said friction plate and side plate having openings registering with the open spaces between the spokes on the hub member, coil springs seated in said openings between the end walls thereof and the spokes and forming a sectional spring cushion between the friction member, and the hub member and lips on the plates between the ends of the openings therein and normally out of engagement with said springs for preventing displacement thereof.

8. A driven plate for friction clutches comprising a hub member having a flange, a friction plate overlapping said flange, a side plate rigid with the friction plate and overlapping said flange, said plates and flange provided in their overlapped parts with registering openings, springs seated in said openings between the ends thereof, and means on said plates at the sides of the springs clearing the springs in operation but arranged to confine the springs in their seats.

CARL MARTIN AHLENE.
HAROLD V. REED.